Dec. 16, 1924.
T. A. LEWIS
WATER HEATER
Filed Jan. 22, 1920   2 Sheets-Sheet 1
1,519,317
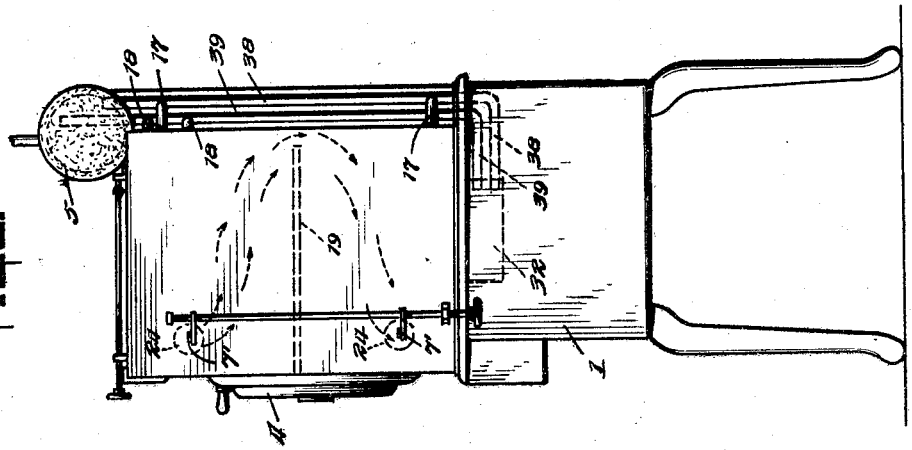
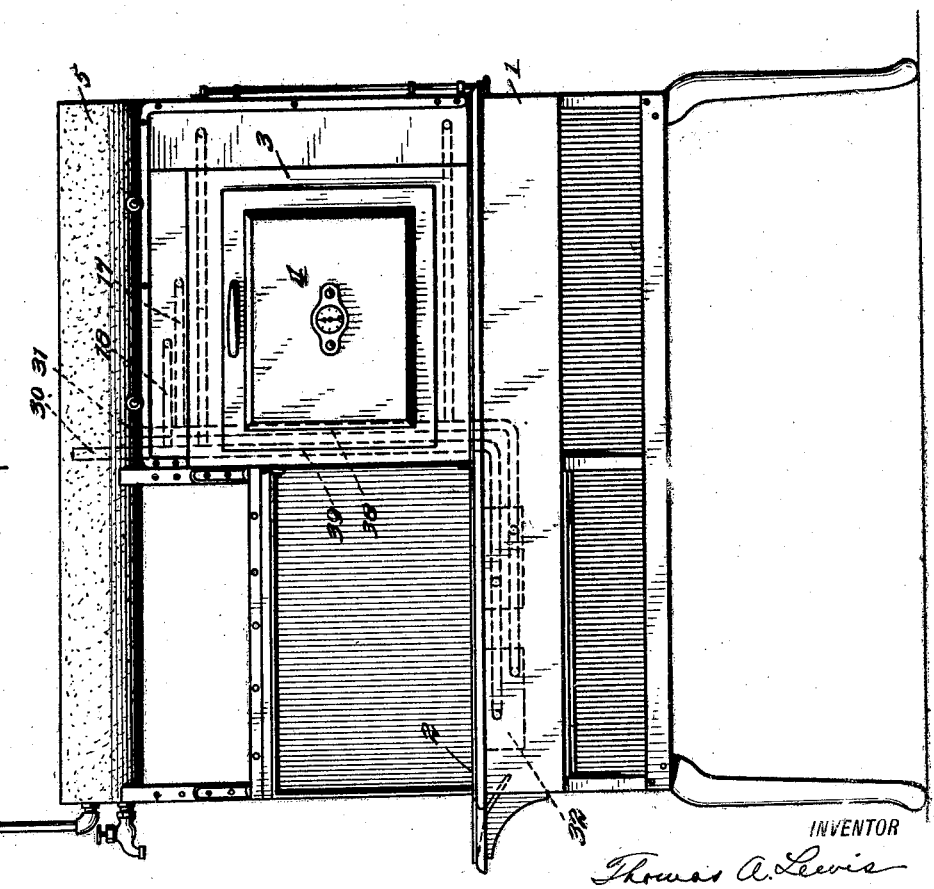
INVENTOR
Thomas A. Lewis
BY
Kenyon & Kenyon
his ATTORNEYS Dec. 16, 1924.                                                    1,519,317
                          T. A. LEWIS
                         WATER HEATER
                     Filed Jan. 22, 1920          2 Sheets-Sheet 2
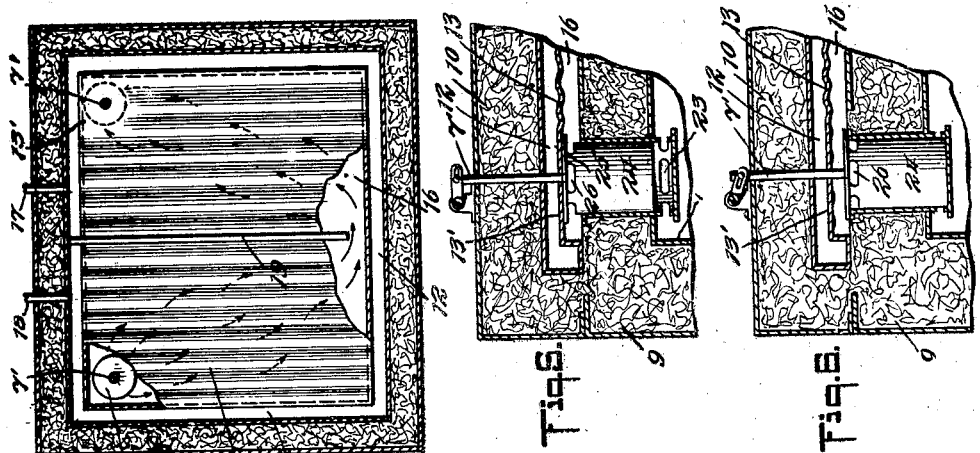
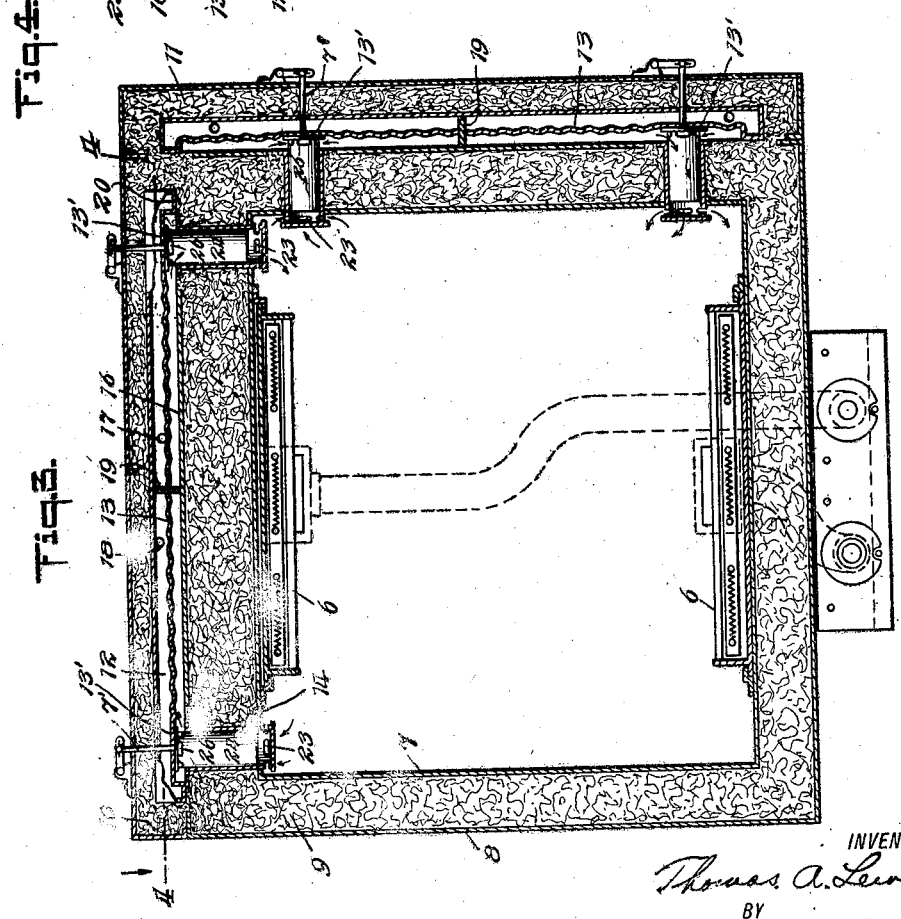
INVENTOR
Thomas A. Lewis
BY
Kenyon & Kenyon
his ATTORNEYS Patented Dec. 16, 1924.

1,519,317

UNITED STATES PATENT OFFICE.

THOMAS A. LEWIS, OF NEW YORK, N. Y.

WATER HEATER.

Application filed January 22, 1920. Serial No. 353,130.

*To all whom it may concern:*

Be it known that I, THOMAS A. LEWIS, a citizen of the United States, and a resident of New York city, in the county of New York and State of New York, have invented new and useful Water Heaters, of which the following is a specification.

My invention relates to devices for heating water, and particularly to that class of such devices adapted to be used as an auxiliary to a heat operated device such, for example, as a cooking range.

In heat operated devices such as cooking ranges wherein the heat is derived from combustion of coal, charcoal, wood, etc., it has been a simple matter heretofore to provide a water back connected to a boiler for the heating of water. But in heat operated devices which are provided with separate units presenting a heated surface and different units for heating an enclosed chamber such as an oven, which produce heat by the combustion of gas, or by electricity, the heating of water economically and without reduction of the efficiency of the heating unit is quite a different problem.

An object of my invention is to provide means for heating water which may be applied to a heat operated device in order to conserve heat that is ordinarily radiated into the atmosphere as waste.

Another object of my invention is to provide water heating devices for use in connection with heat operated devices which will increase the efficiency of the heating units of the device.

Another object of my invention is to provide a water heating device for use in connection with an interiorly heated chamber; a further object being to provide means for conducting heat from the chamber to the water heating element and to provide means for controlling the heat conducting means.

Other and further objects of my invention will appear from the following description taken in connection with the accompanying drawings forming part of this specification and will be pointed out in the hereunto appended claims. While I shall describe my invention as embodied in cooking ranges, it is to be understood that it will apply as well to other heat operated devices having open or enclosed heating units.

In the drawings wherein like reference characters refer to similar parts—

Fig. 1 is a front elevation of a range embodying my invention;

Fig. 2 is a side elevation of the range shown in Fig. 1;

Fig. 3 is a vertical sectional view of the oven of the range shown in Fig. 1;

Fig. 4 is a cross-sectional view on the line 4—4 of Fig. 3; and

Figs. 5 and 6 are fragmentary detail views of the valve construction.

In the embodiment of my invention which is illustrated in the drawings for the purpose of fully disclosing the features of my invention, the range is of the electric type, but might just as well be a range using gas. The usual frame 1 includes a section 2 in which there are positioned the several heating units for direct heating of cooking utensils and upon which there is supported the oven or other enclosure 3 having a door 4. At the upper part of the frame, and above the oven, there is supported a range boiler 5 which is connected to the various water heating devices by means of the hot water inlet pipe 30 and a cold water outlet pipe 31, as hereinafter described.

Referring to Fig. 3 it will be seen that there are positioned within the oven, heating units 6, and that the oven comprises an inner shell 7 and an outer shell 8, preferably of metal, and that the space between the two shells is filled with insulating material 9. An oven so constructed retains the heat of the heating units within it and is, therefore, economical in its cooking operation, but when the cooking operation is completed there is retained within the oven a considerable quantity of heat at 300° to 400° F. and in order to conserve this heat I intend to use it for heating water, and to that end I provide outside of the oven an auxiliary casing 10 which may be on the top or sides, or any other place desired. This casing is made with a metal shell and with heat insulating material, and within the casing is a water heating container or chamber 12 which forms the inner retaining wall for the insulating material, and which has a depressed and corrugated surface 13 so that a chamber 16 is formed between the corrugated surface and the outer wall of the oven. There are cylindrical tubes 14 extending through the walls of the oven to provide communication between the interior of the oven and the chamber 16.

The water heating container or chamber 12 is provided with a cold water inlet 17 and a hot water outlet 18 and a baffle 19 runs almost entirely across the interior of the water heating unit so as to provide a circuitous path for the water through the unit. A similar baffle extends almost entirely across the chamber 16 so as to provide a circuitous path between the two points of communication between the chamber 16 and the interior of the oven.

In order to prevent heat from being absorbed by the water during the cooking operation I remove portions of the exterior wall of the oven at 20 so that the water heating container or chamber 12 will rest upon insulating material and there will be no direct metallic connection between the interior wall of the oven and the water heating unit by means of the cylindrical tubes 14. In order to prevent heat from being absorbed by the water heating unit during the cooking operation I also provide the following valve construction. The inner ends of the cylindrical tubes 14 are provided with caps 22, having openings 23 in their periphery. Within the cylindrical tube 14 there is positioned a valve member 24 which has a cap 25 similar to that of the tube 14, and provided with peripheral openings 26. When the valve member 24 is pushed inwardly toward the oven its inner end will close the openings 23 of the tube 14 and its openings 26 will be within tube 14 and be closed by it. But when by means of the valve stem 7' which obviously may be of material having a low heat conductivity such as fiber and which extends through the housing 10 the valve member 24 is drawn outwardly from the oven, the openings 23 are open, permitting the ingress of heated air and the openings 26 are uncovered, permitting the ingress of heated air into the chamber 16. It is also to be noted that the corrugated surface 13 has a flattened portion 13' surrounding the opening for the valve stem 7' so that the cap 25 of the valve member 24 comes in close contact with the water heating unit. Thus there is established at the time when heating of the water is desired a metallic heating conductor or conduit from the interior of the oven directly to the water heating unit by means of the tube 14 and the valve member 24.

It will be apparent from the construction described that I am able to thoroughly insulate the water heating container such as 12 from the oven so that no heat will be absorbed by the water during the cooking operation, because in addition to the insulation above described it will be noted that the valve 24 when closed provides a dead air chamber between the oven and the chamber 16; and it will also be apparent that after the cooking operation is completed it is possible to provide for the conduction of heat from the oven to the water heating chamber both by means of the heated air and by conduction through metallic contact.

I have ascertained by actual test that merely forming a receiver so as to contain an enclosed space will in itself slightly increase the efficiency of the heating unit, and I have also ascertained that the presence of water in the closed space in the receiver does not appreciably decrease the efficiency of the heating unit, but on the other hand results in a conservation of heat by absorption in the water which increases the efficiency of the heating unit very materially, and in certain tests which I have made more than 27 per cent.

It will be apparent that the valves which control communication between the oven and the water heating chamber 16 may be so manipulated that the water heating operation may be begun at a time dependent upon the oven temperature rather than at a time depending upon the completion of the oven operation.

While I have described my invention in considerable detail I do not intend to be limited to the features described but intend that my invention will be defined by the hereunto appended claims.

What I claim as new and desire to secure by Letters Patent is:

1. In combination with an enclosure, a hot water tank, heating units within and outside of said enclosure and a water-heating container respectively associated with said heating units and connected to said tank, said container being outside of said enclosure and means being provided for conducting heat from said enclosure to said container.

2. In combination a heat insulated oven, a heating element therein, a water-heating container exterior of said oven and means adjustable to retain heat within said oven or conduct heat from the interior of said oven to said water heating container.

3. In combination a heat insulated oven, a heating element therein, a water-heating container exterior of said oven, means for conducting heat from the interior of said oven to said water heating container, and means for controlling said conducting means.

4. In combination a heat insulated enclosure, means for heating the interior thereof, a water-heating container exterior of said enclosure, and means for conducting heat from the interior of said enclosure to said water-heating container and including means for providing a metallic heat conductor from said enclosure to said container.

5. In combination a heat insulated enclosure, means for heating the interior thereof, a water-heating container exterior of said enclosure and insulated therefrom, and means for providing a metallic heat conductor from the interior of said enclosure to said container.

6. In combination an oven enclosure, a heating element therein, said enclosure having a side wall provided with openings respectively in its upper and lower portions, a casing surrounding said openings and forming a chamber with said side wall, and a water heating container in said chamber.

7. In combination a heat insulated enclosure, means for heating the interior thereof, a water-heating container exterior of said enclosure and controllable means for conducting heated air from said enclosure to said container and establishing a metallic heat conductor from the interior of said enclosure to said container.

8. In combination a heat insulated enclosure, a water-heating container forming with the exterior thereof a chamber and means for opening and closing communication between said enclosure and said chamber.

9. In combination a heat insulated enclosure, a water-heating container forming with the exterior thereof a chamber and means for opening and closing communication between said enclosure and said chamber and respectively forming and breaking a metallic heat conductor from said enclosure to said container.

10. In combination a heated member, a water-heating container associated therewith and means for making and breaking a metallic heat conductor from said member to said container.

11. In combination a heated member, a water-heating container associated therewith and means for making and breaking metallic and air heat conductors from said member to said container.

12. In combination an oven enclosure, a heating element therein, said enclosure having a side wall provided with openings respectively in its upper and lower portions, a casing surrounding said openings and forming a chamber with said side wall, a water heating container in said chamber, and members adjustable to close said openings or provide a solid heat-conducting conductor from the interior of said enclosure to said container.

13. In combination a heat insulated enclosure, a heat insulated casing associated therewith, a water-heating container in said casing, and means for making and breaking a metallic heat conductor from said enclosure to said container.

14. In combination a heat insulated enclosure, a heat insulated casing associated therewith, a water-heating container in said casing, and means for making an air current from said enclosure to said casing and for breaking said current and forming a dead air space.

15. In combination a heat insulated oven, a heat insulated casing associated therewith, a water-heating container in said casing, and means for making and breaking an air current from said oven to said casing, said means also making and breaking a metallic heat conductor from said oven to said container.

16. In combination an enclosure having openings in a wall thereof, a water-heating container forming a chamber into which said openings lead, and means for controlling said openings, and providing a metallic heat conductor from said enclosure to said container.

17. In combination an enclosure having openings in a wall thereof, and a water-heating container forming a chamber into which said openings lead, said chamber having a baffle between said openings.

18. In combination a heat insulated enclosure having openings in a wall thereof, a water-heating container exterior of said enclosure and a heat insulated casing co-operating with said enclosure to enclose said container and embrace said openings.

19. In combination an enclosure having openings in a wall thereof, and a water-heating container exterior of said enclosure and forming with said wall a chamber into which said openings lead.

20. In combination an enclosure having openings in a wall thereof, and a water-heating container exterior of said enclosure and having a depressed portion whereby a chamber is formed with said wall into which said openings lead.

21. In combination an enclosure having openings in a wall thereof, a water-heating container exterior of said enclosure and having a depressed portion whereby a chamber is formed with said wall into which said openings lead, and means for controlling said openings.

22. In combination an enclosure having openings in a wall thereof, a water-heating container exterior of said enclosure and having a depressed portion whereby a chamber is formed with said wall into which said openings lead, and means for controlling said openings, and making and breaking a metallic heat conductor from said enclosure to said container.

23. In combination an enclosure having heat insulated walls, a water-heating container exterior of said enclosure, tubes extending through said walls and metallic means adjustable to form a dead air space within said tubes or a metallic heat conductor from the said container to the interior of said enclosure.

24. In combination an enclosure having heat insulated walls, a water-heating container exterior of said enclosure, metallic tubes extending through said walls and means for opening and closing said tubes and making or breaking a metallic conductor from the interior of said enclosure to said container.

In testimony whereof, I have signed my name to this specification.

THOMAS A. LEWIS.